(12) United States Patent
Guderzo

(10) Patent No.: US 7,276,899 B2
(45) Date of Patent: Oct. 2, 2007

(54) POSITIONAL TRANSDUCER AND MOTOR DRIVEN GEAR CHANGER FOR A BICYCLE

(75) Inventor: Gianfranco Guderzo, Arzignano (IT)

(73) Assignee: Campagnolo Srl., Vicenza (IT)

( * ) Notice: Subject to any disclaimer, the term of this patent is extended or adjusted under 35 U.S.C. 154(b) by 0 days.

(21) Appl. No.: 11/369,273

(22) Filed: Mar. 7, 2006

(65) Prior Publication Data

US 2006/0145688 A1 Jul. 6, 2006

Related U.S. Application Data

(63) Continuation of application No. 10/205,181, filed on Jul. 24, 2002, now Pat. No. 7,009,387.

(30) Foreign Application Priority Data

Jul. 24, 2001 (IT) ............................ TO2001A0730

(51) Int. Cl.
*G01B 7/30* (2006.01)
(52) U.S. Cl. ............................ 324/207.2; 324/207.25; 324/174
(58) Field of Classification Search ................ 324/207.12–207.25, 173, 174
See application file for complete search history.

(56) References Cited

U.S. PATENT DOCUMENTS

| 4,570,118 A | 2/1986 | Tomczak et al. |
| 5,130,650 A | 7/1992 | Lemarquand |
| 5,226,501 A | 7/1993 | Takata |
| 5,257,014 A | 10/1993 | Zimmermann |
| 5,332,965 A | 7/1994 | Wolf et al. |
| 5,475,305 A | 12/1995 | Jiles et al. |
| 5,861,745 A | 1/1999 | Herden |
| 6,104,187 A | 8/2000 | Marx et al. |
| 6,196,347 B1 | 3/2001 | Chao et al. |
| 6,201,389 B1 | 3/2001 | Apel et al. |
| 6,278,216 B1 | 8/2001 | Li |
| 6,429,647 B1 | 8/2002 | Nicholson |
| 6,479,987 B1 | 11/2002 | Marx et al. |

FOREIGN PATENT DOCUMENTS

| DE | 199 53 190 A1 | 5/2001 |
| EP | 0 612 974 A2 | 8/1994 |
| EP | 0733881 | 10/1998 |

OTHER PUBLICATIONS

Wenping & Co., English Translation of Taiwanese Decision on Examination of Application No. 901243390, dated Nov. 13, 2002.

*Primary Examiner*—Jay M Patidar
(74) *Attorney, Agent, or Firm*—Volpe and Koenig, P.C.

(57) ABSTRACT

A transducer comprising a fixed part and a mobile part which are mounted for relative motion about a given axis. On the shaft of the rotor part there is fitted a magnetized element consisting, for example, of an annular element diametrically magnetized at a single pair of poles. Mounted on the fixed part is a pair of Hall-effect sensors which are set angularly staggered by 90° about the axis of rotation of the shaft. The Hall-effect sensors generate corresponding output signals having values that vary in a continuous range. The values of the output signals generated by the transducer uniquely identify the relative positions of the aforesaid fixed and mobile parts with respect to the axis of rotation.

10 Claims, 4 Drawing Sheets

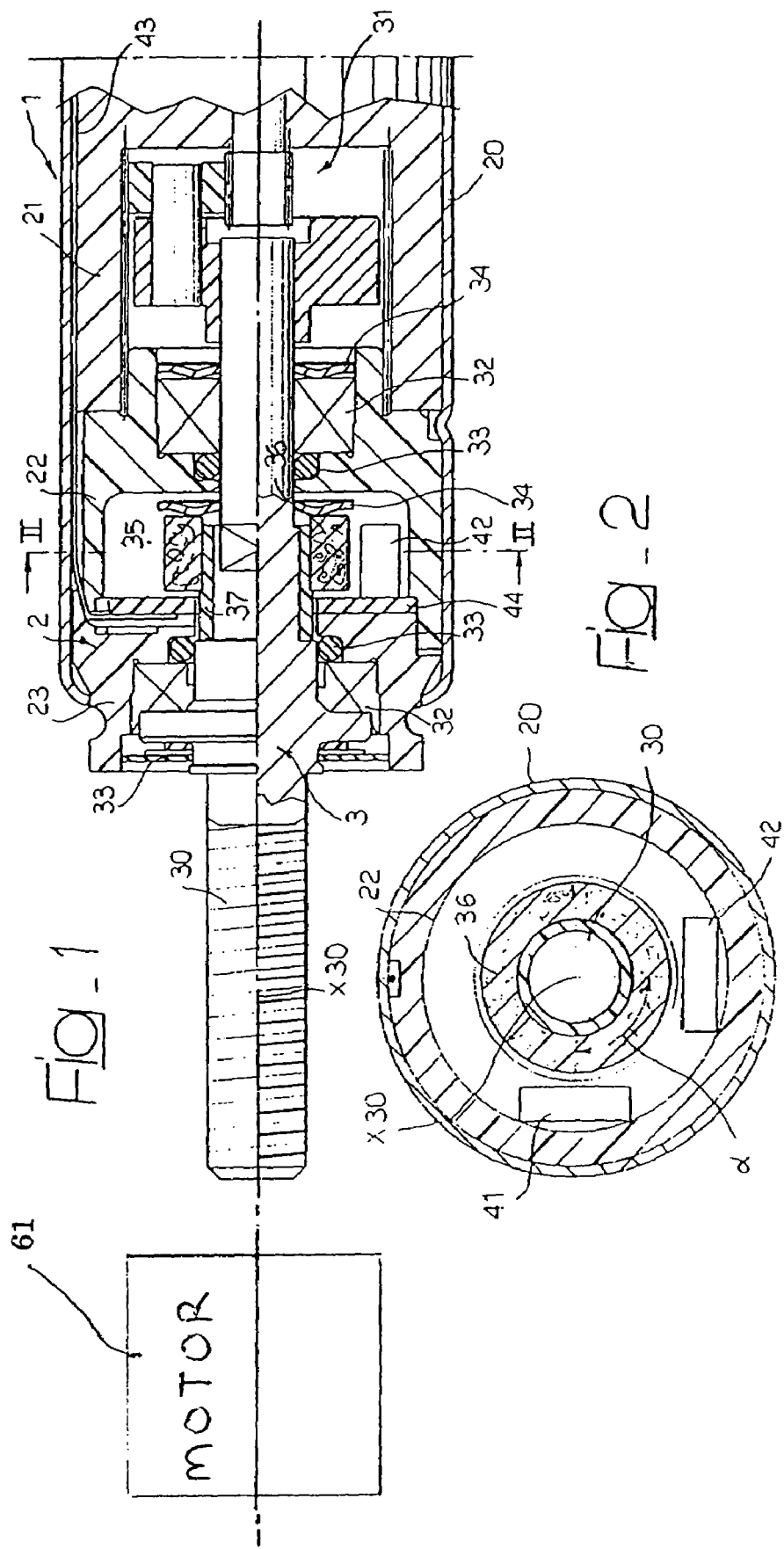

POSITIONAL TRANSDUCER AND MOTOR DRIVEN GEAR CHANGER FOR A BICYCLE

CROSS REFERENCE TO RELATED APPLICATION(S)

This application is a continuation of U.S. patent application Ser. No. 10/205,181, filed Jul. 24, 2002, now U.S. Pat. No. 7,009,387 which is incorporated by reference as if fully set forth.

FIELD OF INVENTION

The present invention relates to transducers of angular quantities for cycles. The solution according to the invention has particular application to cycles, such as competition bicycles, especially in view of its possible use in motor-driven gear changes and/or for performing functions such as detection of the movement of the chain, determination of the direction of said movement, angular position ("phase") or speed (pedal cadence) of the bottom bracket of the bicycle, etc.

BACKGROUND

Application of the invention on board a cycle imposes on a transducer somewhat critical constructional and operational requirements. The transducer should present intrinsic qualities of sturdiness, simplification in the connections, high precision, and constant performance. These features have been difficult to achieve with traditional solutions.

For example, the use of transducers of a potentiometric kind is linked to intrinsic critical factors. These transducers generally comprise at least two parts that are in mutual sliding contact (these are, in the majority of cases, a mobile pin or brush that slides on a resistive race). In order to co-operate properly, these parts must be connected in a very precise way and must not be affected—which in practice is almost unavoidable—by stresses due to vibration and/or linked to the change in the direction of rotation, or be excessively sensitive to environmental factors, such as variations in the characteristics of the components with temperature or absorption of humidity. All of the aforesaid factors argue against the use of potentiometric transducers.

Transducers of an optical type (namely, of the type commonly referred to as optical "encoders") overcome some of the above-mentioned drawbacks with potentiometric transducers. However, they are generally costly, can be sensitive to stresses, and usually require quite a high number of connections. In addition, optical sensors of the encoder type are intrinsically digital sensors, the detecting action of which is based upon the fact that the movement of rotation being sensed leads to alternately light and dark bands or segments passing in front of an optical sensor.

The purpose of the present invention is to provide a transducer of angular quantities for a cycle that is able to overcome the intrinsic drawbacks of the solutions according to the prior art.

In brief, the solution according to the invention is based upon the preferential use of a combination of Hall-effect sensors, preferably with analog-type outputs, i.e., such as to generate continuous transduction signals rather than a discrete digital signals, the output signals of which can assume only distinct values (namely, "0" and "1").

Preferably, the invention envisages the use of a pair of mechanical Hall-effect sensors staggered with respect to one another by 90 mechanical degrees, with the magnetic parts not in contact. In this way it is possible to generate two electrical signals that are 90° out-of-phase with respect to one another in patterns, which vary according to a repetitive/periodic function, having preferably sinusoidal patterns or linear patterns.

The use of Hall-effect semiconductor sensors able to supply at output a voltage proportional to the induction is known. In particular, it is known that this type of sensor can supply at output both analog signals of a linear type and digital signals with single or double polarity.

By combining together different sensors and/or different polar magnetization pitches it is possible to combine together different sensor functions, including the functions of detection of speed of rotation, direction of rotation, and positioning.

Indeed it is precisely the above characteristics, combined to wide ranges of operation (also as regards temperature variations) and the considerable reliability that have contributed to the success of the above sensors in the automobile sector and in the sector of household appliances, above all for controlling motors.

For example, from U.S. Pat. No. 5,332,965, a sensor is known which is designed to detect the angular position of an element such as a butterfly valve and which comprises a Hall-effect sensor, as well as a plurality of flux concentrators. The flux-concentrator configuration is designed to perform an action of linearization of the output characteristics of the Hall-effect sensor. The sensor is calibrated by varying the distance between the flux concentrator and the magnet. In one embodiment, the flux transducer performs a temperature compensation of the sensor, which is hermetically sealed so as not to be affected by phenomena of wear and/or vibration.

From European Patent No. EP 0 733 881, another angular-position sensor without contact is known which comprises a Hall-effect sensor set in a central position with respect to an annular magnet.

Again, from U.S. Pat. No. 6,104,187, a contactless magnetoresistive angular sensor is known which comprises two anisotropic magnetoresistance (AMR) elements rotated through 45° with respect to one another and comprised in respective resistive bridges. The sensor in question is designed to be used in a position detector associated to butterfly valves or to elements such as pedals, with particular care taken to ensure that the zero position of the sensor is temperature-stable.

SUMMARY

A transducer of angular quantities for a cycle, comprising first and second parts which detect relative movement of rotation about a given axis. A magnetized element is integrally fixed to one of the first and second parts. At least one pair of Hall-effect sensors is set angularly staggered with respect to one another about the axis and integrally fixed to the other of the first and second parts. The Hall-effect sensors are sensitive to the presence of the magnetized element to generate respective output signals with values varying in a continuous range. The values of the respective output signals uniquely identify the relative position of the first and second parts with respect to the axis.

BRIEF DESCRIPTION OF THE DRAWING(S)

The invention will now be described purely by way of non-limiting example with reference to the attached drawings in which:

FIG. 1 is an axial sectional view of a transducer according to the invention;

FIG. 2 is a sectional view taken according to the line II-II of FIG. 1;

DETAILED DESCRIPTION OF THE PREFERRED EMBODIMENT(S)

Figure 3:
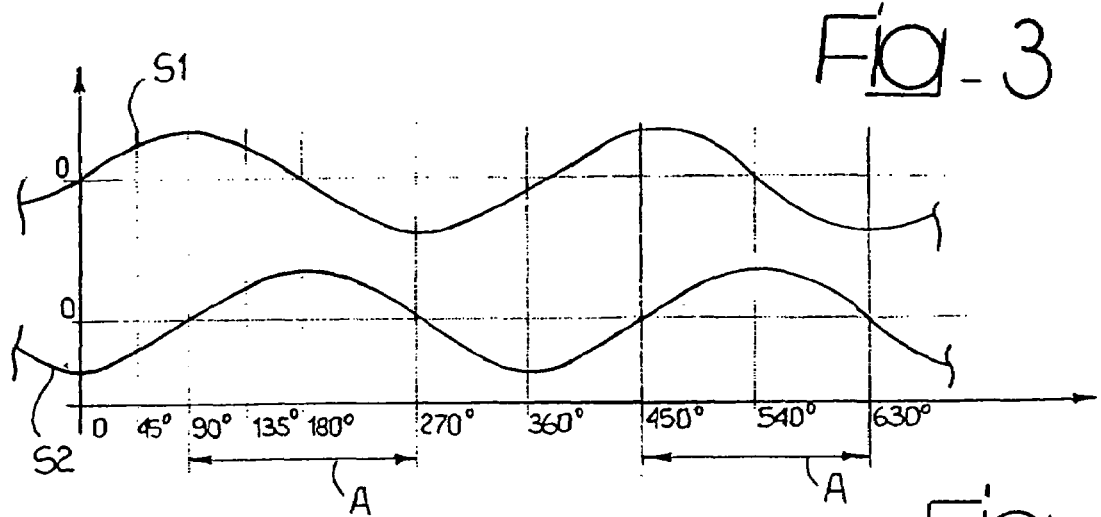
FIGS. 3 and 4 illustrate possible plots in time of the signals generated by a transducer according to the invention.

The term "angular quantities" is used herein to indicate in general physical quantities that are in some way linked or correlated to a rotational movement, such as angular position, angular velocity, angular acceleration, angular moment, speed, torque, etc.

In FIG. 1 the reference number 1 designates, as a whole, a transducer of angular quantities for a cycle which is basically made up of a fixed part, or stator, designated by 2, and a mobile part, or rotor, designated by 3.

In the bicycle embodiment herein illustrated (which is an example with particular reference to the possible application of the transducer 1 on board a cycle), the fixed, or stator, part 2 of the transducer 1 has an overall cylindrical/tubular shape and is made in such a way as to possess intrinsic characteristics of mechanical strength and resistance to impact, vibrations, as well as to external agents (temperature, water, oil and fuel, dust of various kinds, etc.) to which a component of this sort mounted on board a cycle is in general likely to be exposed.

In brief, it may be noted that the aforesaid stator part 2 usually comprises an outer shell 20, for example made of metal material, inserted in which are one or more shaped bodies 21, 22, 23 having overall tubular structures (for example with cup-shaped or nesting configurations) which enable said bodies to be fitted into one another in view of their subsequent insertion inside the shell 20.

The overall annular or tubular structure of the bodies 21, 22 and 23 is aimed at facilitating insertion of the rotor part 3, which is essentially configured as a shaft 30 which can rotate about its own axis X30. In the specific embodiment here illustrated, the axis X30 is also the main axis of the shell 20.

The transducer 1 is designed to output signals indicating angular quantities that are characteristic of the possible movement of the shaft 30 with respect to the shell 20, and hence of the possible relative movement of parts and/or elements connected to the shaft 30 and to the shell 20.

Figure 7:
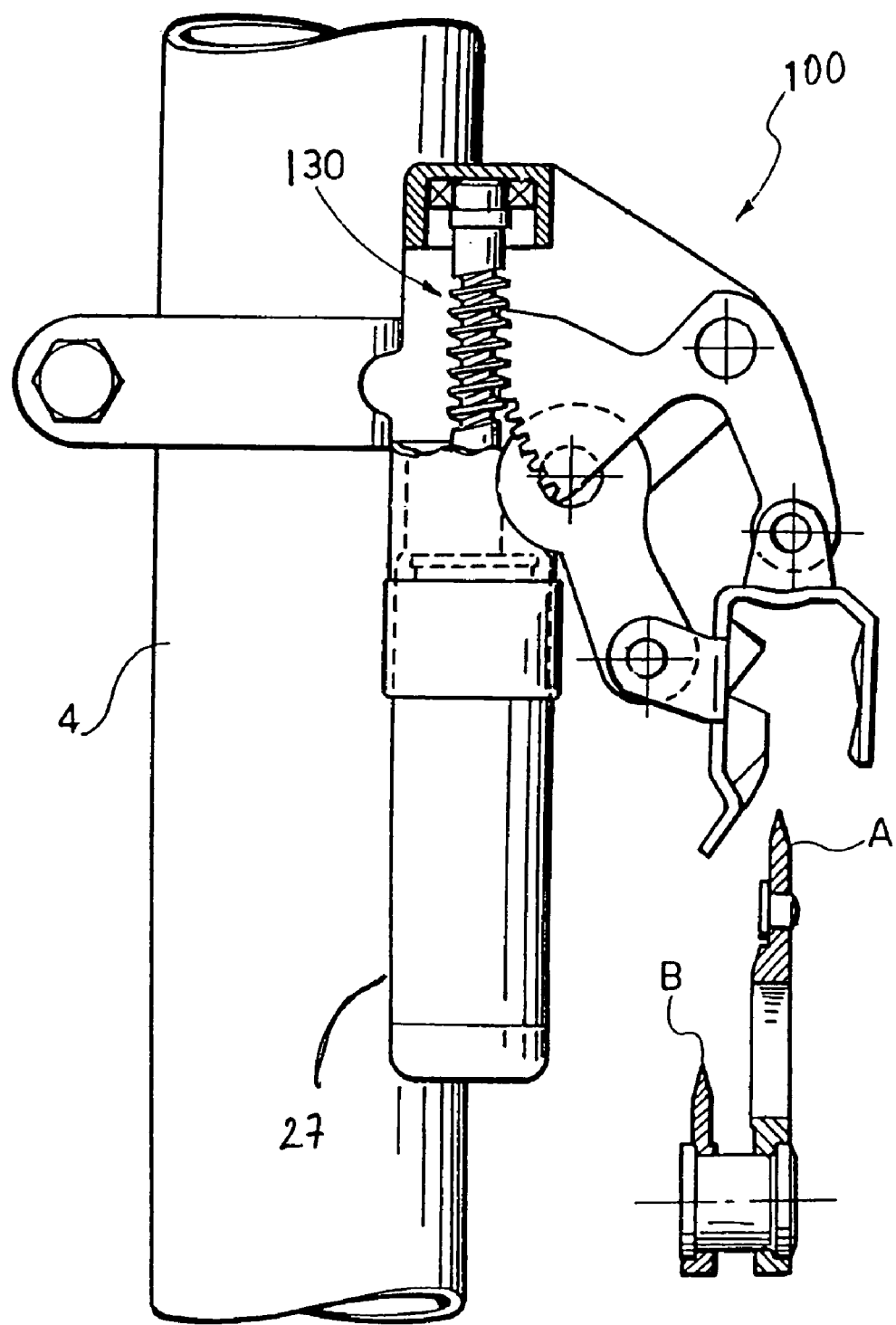
FIG. 7 illustrates the transducer of the present invention in use with a motorized derailleur.

The shaft 30 may be either a "passive" shaft, i.e., designed to be driven by a member (not illustrated) the characteristics of rotation of which with respect to the shell 20 are to be detected, or an "active" shaft, which, by means of a mechanism 31, actuates a mobile member 130 (FIG. 7), the above being the result of an action of driving in rotation of the shaft 30 exerted by a motor 61.

The transducer may possibly be integrated in a motor/actuator, such as the motor/actuator 27 (FIG. 7) of a motor-driven gear change 100 mounted on a cycle 4, such a competition bicycle.

The reference number 32 designates two bearings which support and guide the shaft 30 in a precise and regular movement of rotation of the shaft 30 with respect to the shell 20 (i.e., about the axis X30).

The reference number 33 designates various seal elements, also of a known type, associated to the bearings 32 and/or to the end part of the shell 20.

Finally, the reference number 34 designates two Belleville washers designed to apply, to the ensemble of parts just described, a slight axial elastic pre load (i.e., in the direction of the axis X30) in order to prevent undesired vibrational phenomena and/or play.

An important characteristic of the solution according to the invention lies in the fact that mounted, for example in a recess 35 made in the part of the stator designated by 22, is a set of Hall-effect sensors in turn comprising a fixed, or stator, part connected to the stator 2 and a mobile, or rotor, part connected to the rotor 3.

In particular, the fixed, or stator, part of the set of sensors comprises two Hall-effect sensors 41, 42 mounted angularly staggered with respect to one another by 90° (see FIG. 2) about the axis X30.

The reference number 43 designates a set of supply/signal lines coming under the sensors 41 and 42. The latter are preferably mounted on a supporting base 44 having an annular shape. The base 44 surrounds the shaft 30, even though it is of course mounted in a fixed position with respect to the stator part 2 of the transducer 1.

The mobile, or rotor, part of the transducer instead consists of a ring of magnetized material (also in this case according to known criteria) fitted on the shaft 30. Fitting may be, for example, with interposition of a tubular sleeve or bushing 37, which moves in rotation with the shaft 30 about the axis X30.

Figure 6:
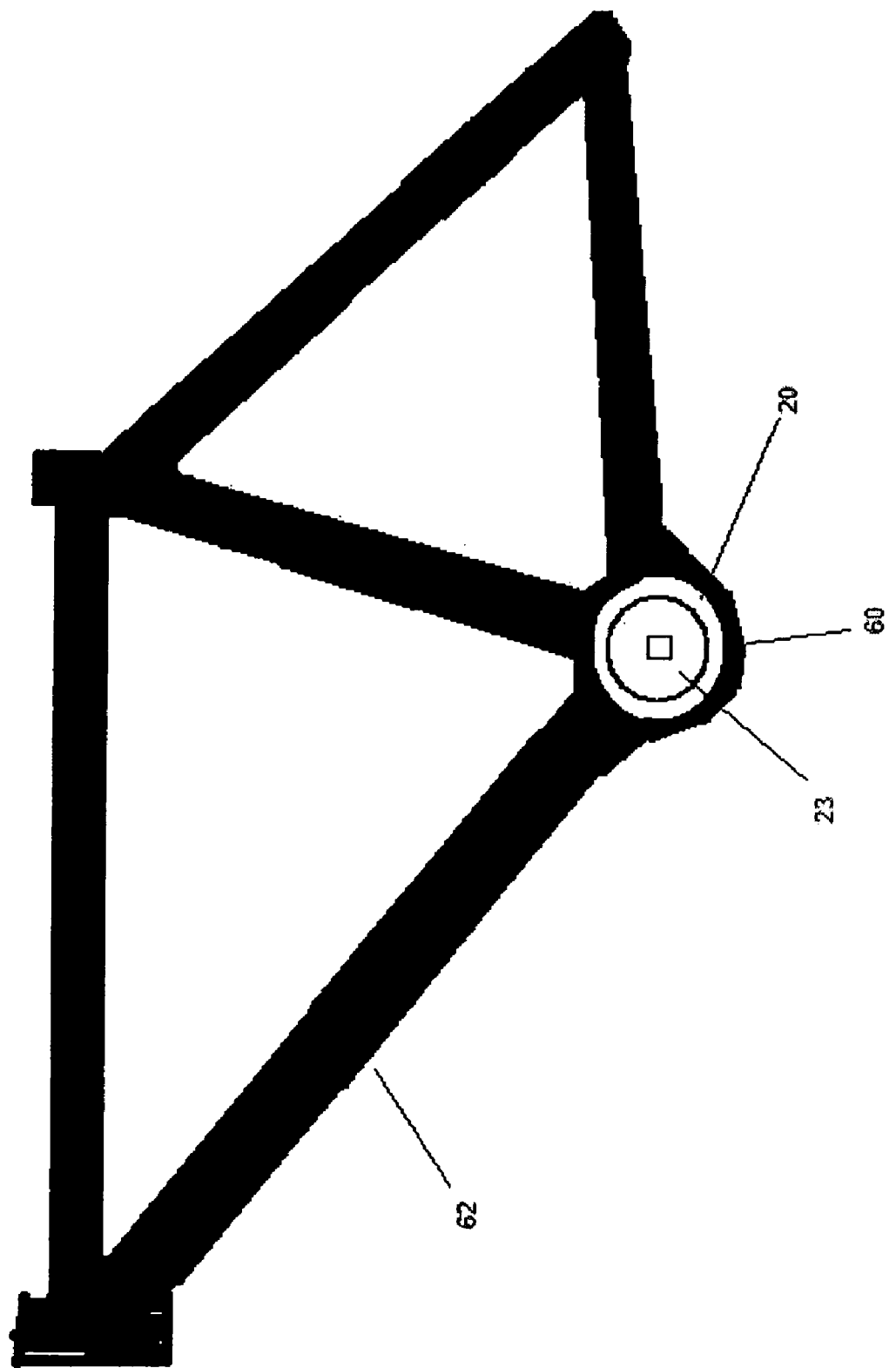
FIG. 6 illustrates a mounting for a transducer of the present invention in a bicycle frame.

As shown in FIG. 6, rotor 23 and stator 20 may be housed within the bottom bracket 60 of a bicycle frame 62.

Figure 4:
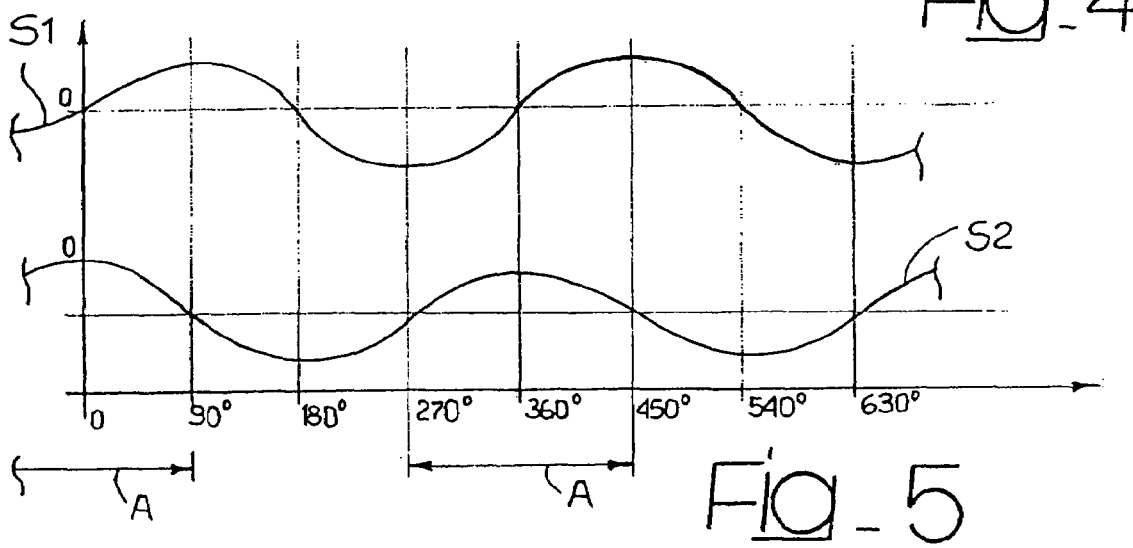
Figure 5:
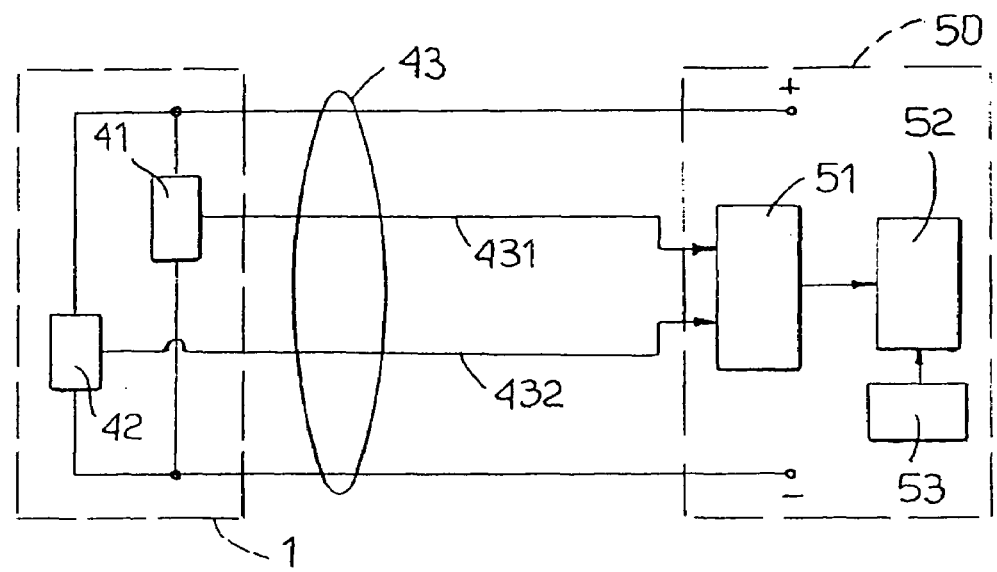
FIG. 5 illustrates, in the form of a block diagram, a possible connection configuration of a transducer according to the invention and of the corresponding signal-processing circuits.

The overall result that may be obtained is the presence, on the signal cables—designated by 431 and 432 in the diagram of FIG. 5—of the sensors 41 and 42, of two signals having a sinusoidal pattern of the type designated by S1 and S2 in FIGS. 3 and 4 (which will be examined in greater detail in what follows).

An important characteristic of the sensors 41, 42 and/or of the ring 36 (in particular as regards the characteristics of magnetization of the latter) lies in the fact that the signals S1 and S2 are periodic signals (usually with an "electrical" periodicity, corresponding to a rotation of the shaft 30 through 360 degrees) such as to be configured as linear or analog signals, i.e., signals the values of which vary over time within a range of possible values that vary in a continuous range, and not in a discrete range as in the case of digital signals.

Even though the currently preferred embodiment envisages the use of signals S1, S2 having a sinusoidal waveform, the solution according to the invention can be implemented also using signals of a different type, such as triangular signals, saw-tooth signals, etc.

The solution according to the invention is suited for being implemented to particular advantage using linear, ratiometric (i.e., with the signal qualitatively unvarying as the voltage varies), temperature-compensated Hall-effect sensors 41, 42. The sensors 41, 42 may consist, for instance, of the components sold under the trade name Hall-Effect Linear Sensors, manufactured by the company Allegro Microsystems, Worcester, Mass. (USA) Sensors of the above type are able to generate output waveforms of the types represented in FIGS. 3 and 4, when a diametrically magnetized ring 36 with a single pair of poles is used.

In view of the fact that the waveforms of the signals S1, S2 are practically invariant as the speed of rotation varies, the ensemble thus configured makes it possible to obtain, with a good degree of precision, the indication of the relative angular positions of the shell 20 and of the shaft 30 (and hence of the stator part 2 and of the rotor part 3 of the transducer 1), at the same time without having to resort to sensor elements which, as in the case of potentiometric sensors, necessarily involve a contact, in particular a sliding contact, between the mobile part and the fixed part.

Both the output signals S1 and S2 are of an analog type. By means of an analog-to-digital conversion it is therefore possible to derive from the said signals numeric values corresponding to the signals measured. The degree of resolution depends uniquely upon the degree of resolution of the conversion and, consequently, can even be quite high without this resulting in a particularly complex transducer structure.

The availability of the two signals S1 and S2 generated by the two sensors 41 and 42 staggered by 90° about the axis of rotation X30 also enables resolution with absolute certainty of any ambiguities linked to:

i) the fact that the signal of each of the sensors 41 and 42 assumes the same value twice in the course of a rotation through 360°, i.e., during one revolution; and ii) the direction of rotation.

Note in FIG. 3 the two identical values assumed by the signal S1 for different values of rotation, such as, for instance, 45° and 135°. The ambiguity regarding the position may be solved if it is noted that, at the aforesaid values of angular position, whilst the signal S1 assumes the same value, the signal S2 assumes values of opposite sign. Consequently, given the same value assumed by S1, the position detected corresponds, for example, to 45° if the value of S2 is negative and to 135° if the value of S2 is positive.

The above example, given for the sake simplicity with reference to the angular values of 45° and 135°, can obviously be applied to the four quadrants, i.e., to any angular position of rotation whatsoever of the shaft 30 about the axis X30.

A comparison between FIG. 3 and FIG. 4 makes it possible to understand that the availability of the two signals S1 and S2 produced by the two sensors 41 and 42 moreover enables any ambiguity linked to the direction of rotation to be resolved.

Suppose that when the shaft 30 turns in one direction, the plots of the signals S1 and S2 are the ones represented in FIG. 3. If the direction of rotation is reversed, the plots of the signals S1 and S2 become the ones represented in FIG. 4.

With reference to the cross-sectional view 20 of FIG. 2:

if the shaft 30 turns in the counter-clockwise direction, the signal S1 of the sensor 41 "precedes" by 90° the signal S2 generated by the sensor 42 (see FIG. 2); and if the shaft 30 turns in the clockwise direction, it is instead the signal S2 generated by the sensor 42 that "precedes" the signal 51 generated by the sensor 41 (see FIG. 3).

The operation of discrimination of the direction of movement can therefore be carried out, for instance, by detecting the sign of the derivative of the signal S1 during the time intervals indicated by A in which the signal S2 assumes a positive value.

Whilst in the case of FIG. 3, the signal S1 has a negative derivative during the time intervals A, in the case of FIG. 4 the said derivative is positive.

The choice of either one of the signals S1 or S2 for performing said verification operations is in any case altogether indifferent. For example, it is possible to achieve the same result by detecting the sign of the derivative of the signal S2 during the time intervals in which the signal S1 has a positive value.

Also performing the aforesaid verification of the direction of movement in the time intervals in which one of the signals has a positive value is purely and simply a matter of choice. The same result could in fact be achieved by carrying out the verification in the time intervals in which the signal considered has a negative value.

Again, the same verification can be made without resorting to the detection of the sign of the derivatives of the signals. It may be readily appreciated (the corresponding verification operation may be carried out by means of any type of module that performs, also at a software level, the function of a flip-flop) that, in the direction of rotation to which FIG. 3 refers, the half-periods in which the signal S1 is positive precede by 90° the half-periods in which the signal S2 is likewise positive. Instead, in the opposite direction of rotation, represented in FIG. 4, it is the positive half-periods of the signal S2 that precede the positive half-periods of the signal 51 by 90°. Similar functions of detection can evidently be implemented using the negative half-periods of the signals S1 and S2.

The diagrams of FIGS. 3 and 4 also show that the transducer 1 is able to perform its function also on a number of revolutions, a feature which may be important, for example, for controlling the position value reached by an actuator designed to perform its action on a number of revolutions. A typical example of the above application is that of electric motors for actuating motor-driven gear changes f or bicycles.

The types of components used for constructing the sensor according to the invention enables a position transducer to be provided that is able to overcome the difficulties that unavoidably beset alternative solutions of a potentiometric or optical type.

The transducer according to the invention is of relatively simple construction and is robust from the standpoint of its application in a demanding environment characterized by the presence of dirt, vibrations, etc., as in cycling.

The diagram of FIG. 5 is a schematic illustration of the modalities of processing of the signals S1 and S2 generated by the transducer 1. The corresponding processing operations can be carried out in a unit 50 integrated at a localized level (for example, using an integrated-microcontroller unit), or else located in a remote position, as in the case in which the aforesaid processing operations are performed in a centralized way by a control unit that also performs other processing functions inherent in the "cycle system".

Processing of the signals may involve processes of self-calibration, linearization, phase relation, etc. The foregoing processes are performed according to known criteria once the signals S1 and S2 present on the signal lines 431 and 432 have undergone analog-to-digital conversion in a corresponding converter 51 associated to the unit 50.

Once the signals S1 and S2 have been converted into digital form in the unit 51, they can undergo processing within a module 52 consisting, for example, of a microcontroller or a microprocessor (of a known type).

As an alternative to a direct use of the signals S1, S2 converted into digital form for processing purposes, the same signals can also be used for a search function in the framework of a conversion table (for example a look-up table) 53 associated to the unit 52.

In this case, the signals S1, S2 are not used for further processing operations in the direct form (i.e., as they emerge from the analog-to-digital conversion operation), but are instead used to search for a pair of corresponding values in the table 53.

The said pair of corresponding values is identified starting form the pair of values of the signals S1 and S2 emerging from the analog-to-digital conversion, according to a given criterion (for example, a criterion of minimum vector distance) or even according to fuzzy-type logic. This choice may be recommended, for example, for those applications in which the signal coming from the transducer 1 is to be used as a driving and/or parametric signal during execution of control operations and/or for implementation of algorithms in which the aim is to avoid undesired phenomena of error propagation.

A transducer according to the invention can be used, for example, in combination with the bottom bracket of a bicycle, with the mobile part driven by the latter. The information that can be obtained using the transducer may then be, for example:

- indication of movement of the chain;
- direction of said movement;
- pedal cadence; and/or
- angular position with respect to a reference point, for example, with respect to the so-called "pre-set shift points" or "fast-shift profiles" provided on the gear wheel A, B (FIG. 7) driven by said bottom bracket 60 to facilitate gear change.

What is claimed is:

1. The combination of a positional transducer and a motor driven gear changer for a bicycle, the combination comprising:
   - a motor driven gear changer associated with a portion of a bicycle frame that positions the motor driven gear changer in an operative association with a gear wheel driven by a chain extending between the gear wheel and a pedal assembly carried by a bottom bracket in a portion of the bicycle frame;
   - a transducer operatively associated with the gear wheel for determining the angular position of the gear wheel with respect to pre-set shift points, the transducer having a first fixed element and a first mobile element which are mounted for relative movement with respect to each other about a predetermined common axis;
   - a magnetized element fixed to a selected first element;
   - at least one pair of Hall-effect sensors fixed angularly with respect to one another about the common axis and fixed to the other non-selected first element within the field of the magnetized element; and
   - at least one pair of conductors, each connected to a respective Hall-effect sensor, for outputting signals generated by relative movement of the first fixed element and the first mobile element about the common axis;
   - whereby the transducer is resistant to environmental attacks and prevents errors in the motor driven gear changer by providing indications of chain movement, direction of chain movement and pedal cadence.

2. The actuator of claim 1, wherein said Hall-effect sensors are angularly staggered by 90° with respect to one another about said given axis.

3. The actuator of claim 1, wherein said magnetized element has an annular shape.

4. The actuator of claim 1, wherein said magnetized element is magnetized at a single pair of poles in the diametric direction with respect to said given axis.

5. The actuator of claim 4, wherein said magnetized element is fitted around one of said first part and said second part.

6. The actuator of claim 1, wherein the transducer has associated thereto an analog-to-digital conversion unit for converting said output signals into corresponding digital signals.

7. The actuator of claim 6, wherein said analog-to-digital conversion unit is integrated in the transducer.

8. The actuator of claim 6, wherein the transducer has associated thereto a processing unit for processing said output signals converted into digital form.

9. The actuator of claim 8, wherein said processing unit has associated thereto a conversion table for generating, starting from said respective output signals converted into digital form, further digital signals usable for processing purposes.

10. The actuator of claim 8, wherein said processing unit is integrated in said transducer.

* * * * *